(12) United States Patent
Thomas III (10) Patent No.: US 6,944,756 B2
(45) Date of Patent: Sep. 13, 2005

(54) CONTROLS FOR RECURSION AT SYSTEM STARTUP

(75) Inventor: Paul Augustus Thomas III, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 646 days.

(21) Appl. No.: 10/044,151

(22) Filed: Jan. 10, 2002

(65) Prior Publication Data

US 2003/0131222 A1 Jul. 10, 2003

(51) Int. Cl.[7] ............................................ G06F 15/177
(52) U.S. Cl. ............................ 713/1; 710/10; 710/104
(58) Field of Search ................................. 713/1, 2, 100; 710/8, 10, 104, 300, 313; 709/252; 707/100, 103 R, 104.1

(56) References Cited

U.S. PATENT DOCUMENTS

| | | | |
|---|---|---|---|
| 5,797,031 A | * | 8/1998 | Shapiro et al. ................. 710/8 |
| 5,854,905 A | | 12/1998 | Garney |
| 5,991,826 A | * | 11/1999 | McGee et al. ................. 710/8 |
| 6,128,731 A | | 10/2000 | Zarrin et al. |
| 6,434,695 B1 | * | 8/2002 | Esfahani et al. ............... 713/2 |
| 6,718,461 B1 | | 4/2004 | Ewertz |
| 6,820,164 B2 | * | 11/2004 | Holm et al. ................. 710/312 |

* cited by examiner

Primary Examiner—Thuan Du
(74) Attorney, Agent, or Firm—Meyertons Hood Kivlin Kowert & Goetzel, P.C.; B. Noël Kivlin (57) ABSTRACT

The present invention provides a method and apparatus for controlling recursion at system startup. The method comprises creating one or more levels of device tree nodes branching from a root node, wherein the number of levels of device tree nodes is equal to a recursion depth. The apparatus comprises a storage unit adapted to store a recursion control process and a control unit adapted to execute the recursion control process, wherein the recursion control process causes the control unit to control recursion during system startup.

31 Claims, 6 Drawing Sheets

CONTROLS FOR RECURSION AT SYSTEM STARTUP

BACKGROUND OF THE INVENTION

1. Field of the Invention

This invention relates generally to managing processor-based system resources, and more particularly, to controlling recursion during the creation of device trees at system startup.

2. Description of the Related Art

In most processor-based systems, a Basic Input Output System ("BIOS") is required at startup. The BIOS is low-level system software that provides an interface between the system hardware (e.g., the chipset and processor) and the operating system. The BIOS is generally encoded in non-volatile read-only memory ("ROM") so that it may be executed at system startup. Furthermore, the BIOS is generally written in low-level assembly language. Because the BIOS is closely tied to the hardware configurations of a particular machine, the BIOS is typically machine-dependent. Therefore, a BIOS written for a one machine may not execute properly on another machine. Accordingly, programmers often write different versions of the BIOS to cover different machines.

Instead of the BIOS, some processor-based systems employ "boot firmware" at system startup. Boot firmware is ROM-based software that is typically executed when a processor-based system is turned on. A primary function of boot firmware is to initialize the hardware and to execute (i.e., "boot") the operating system. Secondary functions of boot firmware include testing the hardware, managing hardware configuration information, and providing various tools for debugging faulty hardware or software in the processor-based system.

One advantage of boot firmware over BIOS is that boot firmware may be system-independent. One example of a system-independent boot firmware is "Open Firmware." Open Firmware is a non-proprietary standard for boot firmware that may be utilized on different processors and busses. Open Firmware was first developed in the late 1980s at Sun® Microsystems, and was designed to be independent of any particular microprocessor or hardware system design. Today, Open Firmware is firmware that complies with IEEE Standard 1275-1994. By providing an interface independent of processor types, Open Firmware allows, among other things, a peripheral device added to the processor-based system to identify itself and supply a boot driver that will allow the device to be utilized on the system. Open Firmware also includes a user interface with debugging capabilities that allow operating systems and system loaders to utilize boot firmware to assist in a system configuration and initialization process. Open Firmware also provides a processor-independent mechanism by which a system can interrogate and configure expansion devices and install device drivers.

One useful Open Firmware feature is support for self-identifying devices. In a firmware environment, the driver for the device is generally stored on the device itself, typically in a nonvolatile memory on the device. The nonvolatile memory may be, for example, an erasable and programmable read-only memory (EPROM). Instead of storing those drivers in machine language, Open Firmware may encode the drivers in a machine-independent language called FCode, a byte-coded intermediate language similar to the Forth programming language, but is encoded as a sequence of binary byte codes representing a defined set of Forth definitions. Forth is based on a stack-oriented virtual machine that may be implemented on virtually any computer.

In one embodiment, Open Firmware may deal directly with hardware devices in the processor-based system. In another embodiment, the operating system may deal with hardware devices in the processor-based system. The FCode encoded in the device may comprise a variety of information about the device, including a unique name representing the type of device and where that device is located in the processor-based system addressing structure. Using the FCode encoded in the device, Open Firmware may build a device tree, which, in one embodiment, is a hierarchical data structure describing the devices attached to the processor-based system. Open Firmware typically builds the device tree in a memory of the processor-based system, such as a random-access memory (RAM).

Some bus standards support a simultaneous connection of a plurality of devices to the bus. For example, the Universal Serial Bus (USB) supports up to 127 devices at one time. Open Firmware may create a device tree comprising several levels of USB hubs and USB devices. The plurality of levels of USB hubs and USB devices may, however, create an overflow of internal structures in the memory of the processor-based system, such that the device tree cannot be successfully built.

SUMMARY OF THE INVENTION

In one aspect of the present invention, a method is provided for controlling recursion at system startup. The method comprises creating one or more levels of device tree nodes branching from a root node, wherein the number of levels of device tree nodes is equal to a recursion depth.

In another aspect of the present invention, a method is provided for controlling recursion at system startup. The method comprises incrementing a recursion level and creating a level of device tree nodes branching from a root node or another level of device tree nodes, wherein the recursion level is less than a recursion depth.

In another aspect of the present invention, a method is provided for controlling recursion at system startup. The method comprises initializing a recursion level, creating a level of device tree nodes, incrementing the recursion level, and comparing the recursion level to a recursion depth and discontinuing the process of incrementing the recursion level and creating the level of device tree nodes in response to the recursion level being equal to the recursion depth.

In another aspect of the present invention, an article comprising one or more machine-readable storage media containing instructions is provided for controlling recursion at system startup. The one or more instructions, when executed, cause a processor to create one or more levels of device tree nodes branching from a root node, wherein the number of levels of device tree nodes is equal to a recursion depth.

In another aspect of the present invention, an article comprising one or more machine-readable storage media containing instructions is provided for controlling recursion at system startup. The one or more instructions, when executed, cause a processor to increment a recursion level and create a level of device tree nodes branching from a root node or another level of device tree nodes, wherein the recursion level is less than a recursion depth.

In another aspect of the present invention, an article comprising one or more machine-readable storage media containing instructions is provided for controlling recursion at system startup. The one or more instructions, when executed, cause a processor to initialize a recursion level, create a level of device tree nodes, increment the recursion level, and compare the recursion level to a recursion depth and discontinue the process of incrementing the recursion level and creating the level of device tree nodes in response to the recursion level being equal to the recursion depth.

In yet another aspect of the present invention, an apparatus is provided for controlling recursion at system startup. The apparatus is comprised of a storage unit adapted to store a recursion control process and a control unit adapted to execute the recursion control process, wherein the recursion control process causes the control unit to control recursion during system startup.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
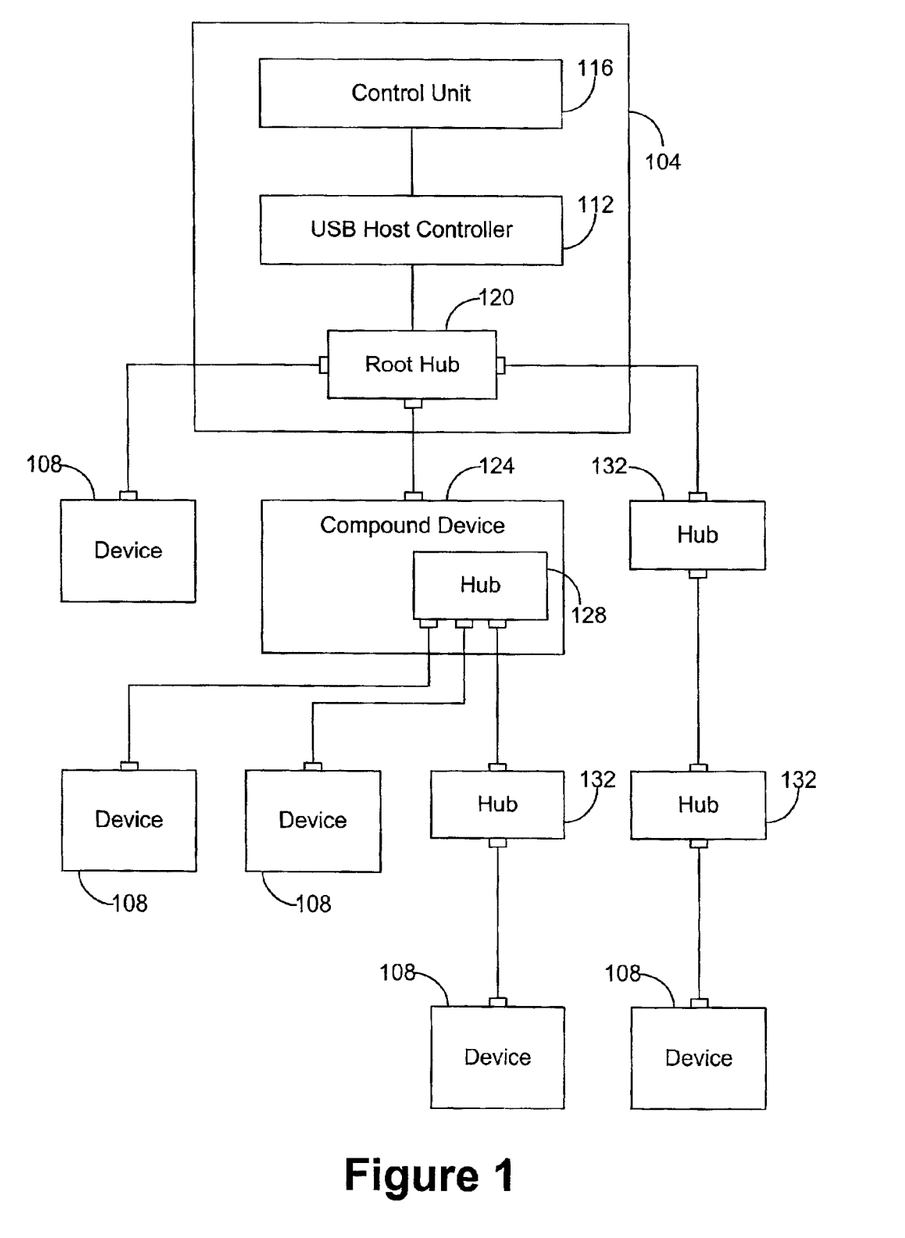
FIG. 1 illustrates a block diagram of a processor-based system programmed and operated in accordance with one embodiment of the present invention.

Turning now to FIG. 1, a processor-based system 104 coupled to a plurality of USB devices 108, in accordance with one embodiment of the present invention, is shown. In the illustrated embodiment, devices such as printers, monitors, keyboards, auxiliary storage drives and scanners may connect to a host device, usually a processor-based system 104, through the USB host controller 112 in a tiered star topology. The processor-based system 104 may be one of a variety of devices, such as a personal computer, a cellular phone, a personal digital assistant (PDA), an Internet appliance, or any other device having one or more processors. Typically, the USB host controller 112 is at the center of the tiered star topology with the control unit 116 on the upper tier and the devices 108 on the lower tier. The control unit 116 of the processor-based system 104 may be a microprocessor, a microcontroller, a digital signal processor, a processor card (including one or more microprocessors or controllers), or other control or computing devices.

The control unit 116 may be coupled to a storage unit (not shown). The storage unit may include one or more machine-readable storage media for storing information. The storage media may be optical or magnetic in nature. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs).

The USB host controller 112 connects to the PCI bus (not shown) of the processor-based system 104. The USB host controller 112 connects to the devices 108 via a root hub 120. The devices 108 can also function as hubs, as illustrated by a compound device 124 that has a hub 128 as part of the compound device 124. The hub 128 of the compound device 124 allows a plurality of other devices 108 to be connected to the processor-based system 104. Furthermore, the compound device 124 may have its own functionality, such as a keyboard that allows connection of a joystick directly to the keyboard. Additional hubs 132 are connected to the root hub 120 and to downstream ports of the compound device 124 to expand the number of devices 108 connectable to the processor-based system 104.

It should be appreciated that the present disclosure is not limited to USB devices. The USB tiered star topology is used throughout the present disclosure solely for the purposes of illustrating the present invention, which may limit the amount of recursion during the creation of a device tree at system startup. The device tree may be created for devices other than USB devices. Any hierarchical device structure connected to the processor-based system 104, such as the USB tiered star topology, may utilize the present invention.

Figure 2:
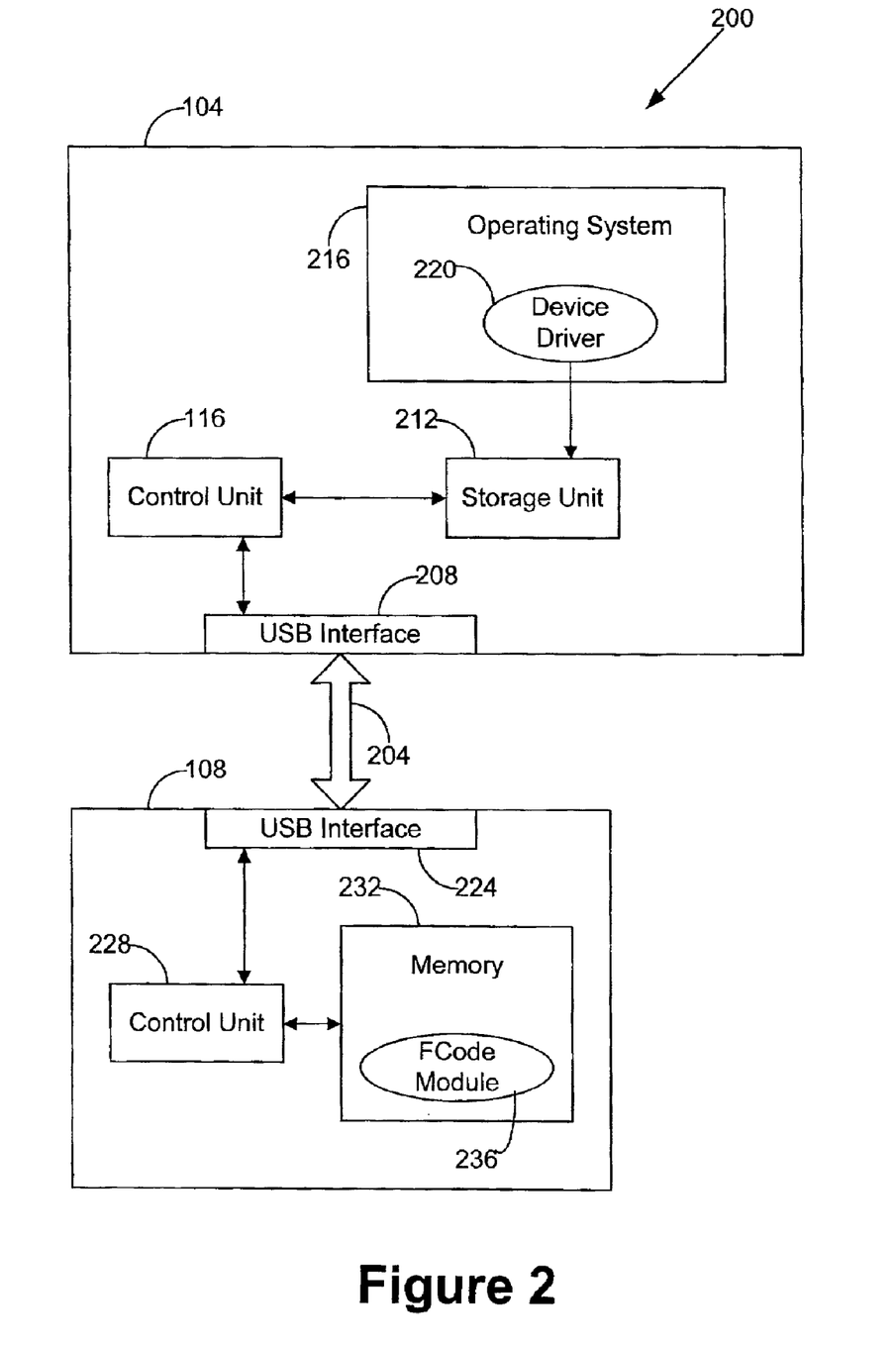
FIG. 2 illustrates an alternate block diagram of the processor-based system of FIG. 1, programmed and operated in accordance with one embodiment of the present invention.

FIG. 2 is a diagram illustrating a standardized bus interface, such as a conventional computer system 200, that may include a processor-based system 104 and a device 108 of FIG. 1. In the illustrated embodiment, a Universal Serial Bus (USB) 204 connects the device 108 to the processor-based system 104. The processor-based system 104 may include a control unit 116 of FIG. 1 connected to a USB interface 208. In one embodiment, the USB interface 208 comprises the USB host controller 112 and the root hub 120 of FIG. 1. In another embodiment, the USB interface 208 may comprise one of a variety of combinations of circuitry and software, such that the plurality of USB devices 108 can be attached to the processor-based system 104.

The control unit 116 executes software application code located in a storage unit 212 and communicates data to and from the device 108 through the USB interface 208 and the USB 204. In the illustrated embodiment, the processor-based system 104 also includes an operating system 216 that includes a software device driver 220. In another embodiment, the software device driver 220 is stored in the storage unit 212. In one embodiment, the software device driver 220 is a program that extends the operating system 216 to support hardware devices such as sound cards, printers, scanners, CD-ROM drives, and the like.

The device 108 may include a USB interface 224, a control unit 228, and an internal memory 232 that may store configuration information describing the characteristics of the device. The internal memory 232 may take the form of any nonvolatile memory, including all forms of read-only memory (ROM) such as programmable read-only memories (PROMs), erasable and programmable read-only memories (EPROMs), electrically erasable and programmable read-only memories (EEPROMs), flash memory, and the like. The internal memory 232 may also take the form of a random access memory (RAM), including dynamic or static random access memories (DRAMs or SRAMs).

As shown, the internal memory 232 of the device 108 comprises an FCode module 236. In one embodiment, the FCode module 236 comprises machine-independent drivers that provide functionality for the processor-based system 104 to operate the device 108. FCode modules are generally hard-coded on the internal memory 232 in the FCode programming language. The phrase "machine-independent" generally means that the same FCode driver can be used on systems with different processor types. For example, the same FCode driver may be used for an Intel® Pentium® processor, an AMD® Athlon® processor, and a Sun® SPARC®.

For clarity and ease of illustration, only selected functional blocks of the processor-based system 104 are illustrated in FIGS. 1 and 2, although those skilled in the art will appreciate that the processor-based system 104 may comprise additional or fewer functional blocks. Additionally, it should be appreciated that FIGS. 1 and 2 illustrate one possible configuration of the processor-based system 104 and that other configurations comprising different interconnections may also be possible without deviating from the scope of one or more embodiments of the present invention.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent throughout the present disclosure, these descriptions refer to the action and processes of an electronic device that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software-implemented aspects of the invention are typically encoded on some form of program storage medium or implemented over some type of transmission medium. The program storage medium may be magnetic (e.g., a floppy disk or a hard drive) or optical (e.g., a compact disc read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 3:
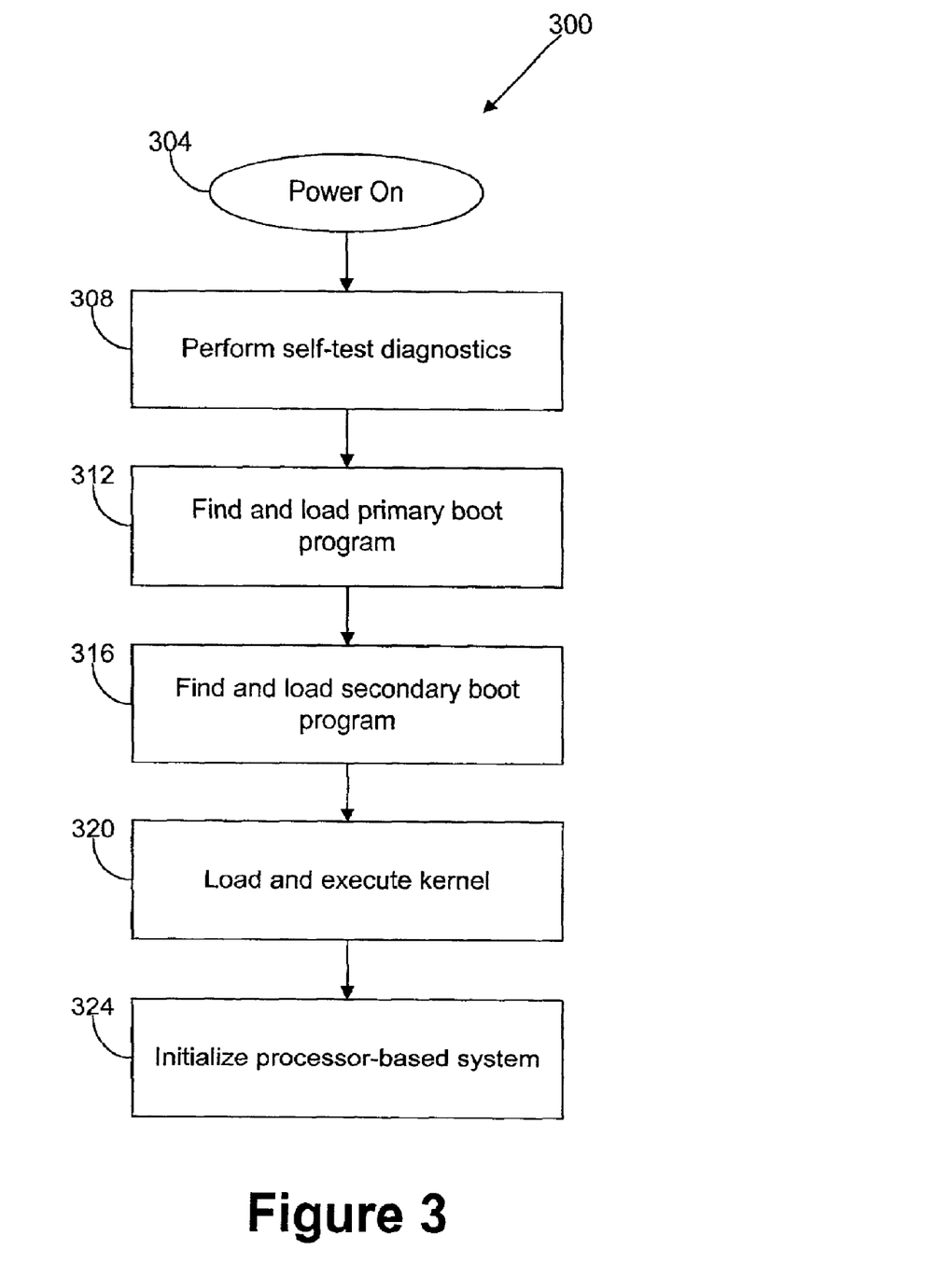
FIG. 3 illustrates a flow diagram of a boot sequence that may be implemented by the processor-based systems of FIGS. 1 and 2, in accordance with one embodiment of the present invention.

Turning now to FIG. 3, a boot sequence 300, in accordance with one embodiment of the present invention, is shown. The power for the processor-based system 104 is turned on (at 304). A programmable read-only memory (not shown) (hereinafter referred to as a "boot PROM") on the processor-based system 104 performs (at 308) self-test diagnostics to verify the hardware and software of the processor-based system 104. In one embodiment, a power-on self test ("POST") is executed to determine if the keyboard, random access memory ("RAM"), disk drives, and other hardware are working correctly. If the hardware is not detected or is found not to be operating properly, an error indication may be displayed following the failure. The error indication may comprise text on the display screen or a series of coded beeps, depending on the nature of the problem and the particular implementation of the POST. Furthermore, because the hardware checked by the POST may be essential to the operation of the processor-based system 104, an error found in the POST may be fatal and cause the boot sequence 300 to stop executing.

In one embodiment, the boot PROM comprises a default boot device that contains the necessary software to begin loading a kernel (described in greater detail below) into the processor-based system 104. The primary boot program is found and loaded (at 312) from the default boot device into the storage unit 212 of the processor-based system 104. In one embodiment, the primary boot program initializes some of the peripherals and memory of the processor-based system 104. A primary boot program finds and loads (at 316) a secondary boot program. The secondary boot program may be found in the storage unit 212 of the processor-based system 104. In one embodiment, the secondary boot program comprises a device driver, which contains a kernel. The secondary boot program loads (at 320) the kernel. The kernel may comprise at least one of a platform-specific kernel and a generic kernel. The kernel may be found in the storage unit 212 of the processor-based system 104. The kernel initializes itself, loads the necessary modules to mount the root file system, and checks for the presence of devices, such as graphic displays, Ethernet controllers, disk controllers, disk drives, and tape devices. The kernel also starts (at 324) the initialization process of the processor-based system 104.

The initialization process may be a series of steps performed by the processor-based system 104. In one embodiment, the initialization process is provided by initialization files and scripts in the storage unit 212 of the processor-based system 104. Among other things, the initialization files and scripts may cause the processor-based system 104 to check and mount file systems and perform various maintenance tasks. Furthermore, the initialization process may cause the processor-based system 104 to create hardware device trees for the devices 108 attached to the processor-based system 104.

Figure 4:
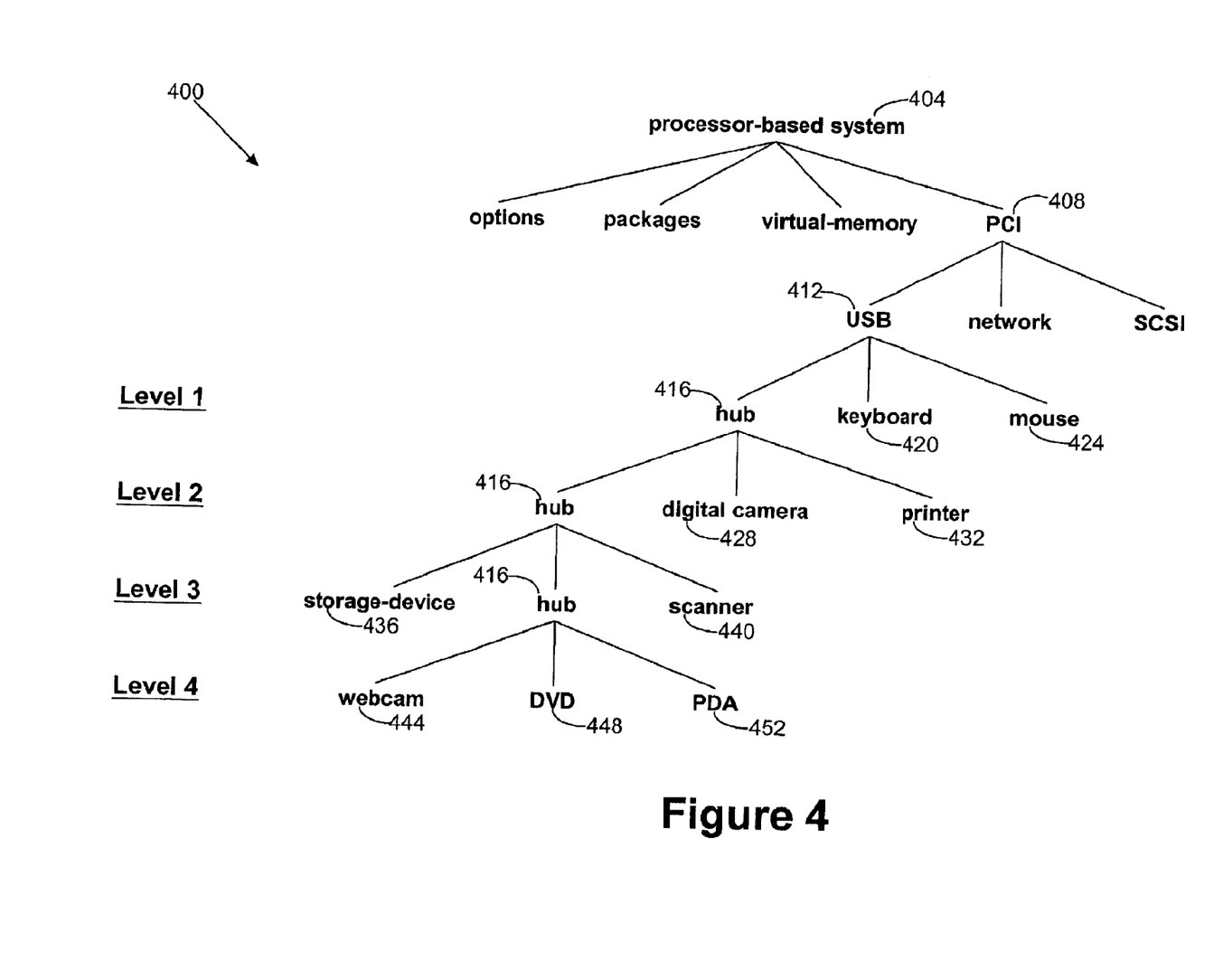
FIG. 4 illustrates a device tree that may be formed during the boot sequence of FIG. 3, in accordance with one embodiment of the present invention.

Turning now to FIG. 4, an exemplary device tree 400, in accordance with one embodiment of the present invention, is shown. As mentioned, the device tree 400 may be a hierarchical data structure describing the devices 108 attached to the processor-based system 104. The device tree 400 is one method for organizing the devices 108 attached to the processor-based system 104. Both a user and an application may determine the hardware configuration of a particular system by inspecting the device tree 400. The devices 108 may be attached to the processor-based system 104 through a hierarchy of interconnected buses. The interconnected buses and their devices may be represented as a tree of nodes.

The term "tree" in the present disclosure represents an organization of the devices 108 that conceptually looks like an upside-down biological tree, where the root is at the top of the tree and the branches on the tree represent interconnected buses. Trees are generally recursive functions. This is generally because recursion may store a plurality of information at each level and allow a user to come back to that state in the future by using tree traversal routines, in accordance with conventional practice. In an iterative solution, for example, separate variables may need to be allocated and managed to maintain the various tree levels. Recursion may provide a simpler solution for forming the tree because a recursive structure, by definition, may involve the storage of previous information.

In one embodiment, a recursive function is a function that calls itself repeatedly on a plurality of levels. A recursive structure, such as a tree, may have itself as its own children, and is thus considered recursive. Recursive structures, however, may utilize large amounts of memory. For example, if the recursive structure calls itself a plurality of times, then a plurality of copies of the same structure may be simultaneously stored in memory. This overhead from the recursive structure may cause an overflow in memory such that a particular tree may not be created properly.

In the illustrated embodiment, a node representing the processor-based system's 104 main physical address bus forms the device tree's 400 root node 404. Nodes with children usually represent buses and their associated controllers, if any. Each such node defines a physical address space that distinguishes the devices 108 connected to the node from one another. Each child of that node is assigned a physical address in the parent's address space. The physical address generally represents a physical characteristic unique to the device 108, such as a bus address or a slot number where the device 108 is installed. The use of physical addresses to identify devices may prevent device addresses from changing when other devices are installed or removed. Nodes without children are known as "leaf nodes" and generally represent the devices 108. However, leaf nodes may represent other items, such as system-supplied firmware services.

In the illustrated embodiment, a peripheral component interconnect (PCI) bus 408 branches from the root node 404. Connected to the PCI bus 408 is a universal serial bus (USB) 412. Branching from the USB 412 are four levels of devices 108, including three hubs 416, a keyboard 420, a mouse 424, a digital camera 428, a printer 432, a storage device 436, a scanner 440, a webcam 444, a digital video disc (DVD) drive 448, and a personal digital assistant (PDA) 452. It should be appreciated that a device tree 400 may contain more or less nodes (i.e., devices 108) than the device tree 400 illustrated in FIG. 4. Furthermore, the device tree 400 may be implemented in any manner in accordance with conventional practice.

Figure 5A:
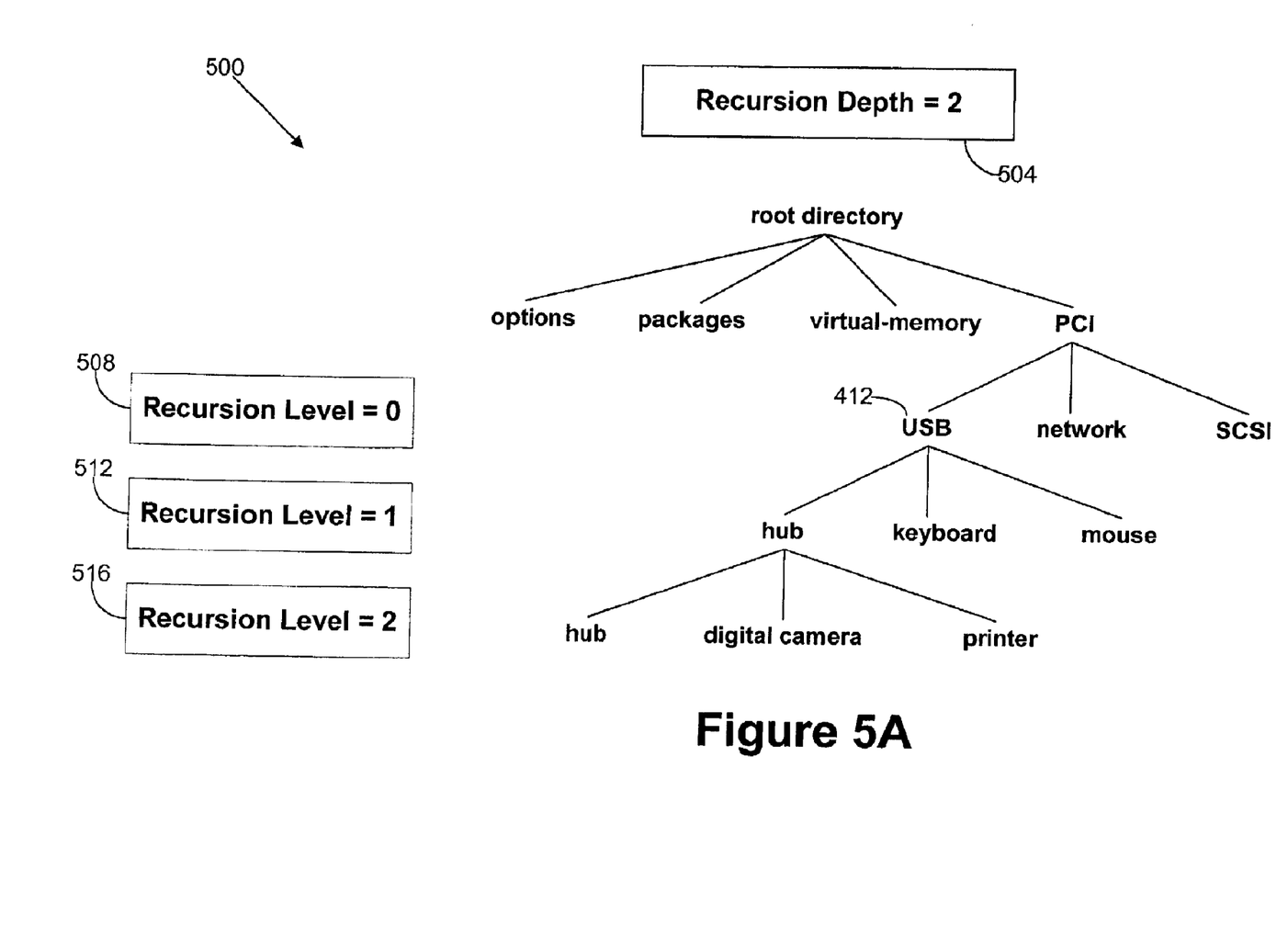
FIG. 5A illustrates an alternate device tree that may be formed during the boot sequence of FIG. 3, in accordance with one embodiment of the present invention.

Turning now to FIG. 5A, an alternative embodiment of the device tree 400 of FIG. 4, in accordance with the present invention, is shown. The USB host controller 112 of FIG. 1 may publish one or more properties, which represent some characteristics of the device tree 500. Those properties may be viewed by the Open Firmware at any time during the creation of the device tree 500. In the illustrated embodiment, the device tree 500 comprises two properties: a recursion depth 504 and a recursion level 508, 512, 516. The device tree 500 is typically created once all the devices 108 attached to the processor-based system 104 have been located. In some circumstances, this may mean spanning several levels of hubs 416 and devices 108, as illustrated in FIG. 5A.

As mentioned, because of the recursive nature of trees, a device tree 500 spanning a greater number of levels may produce a greater amount of overhead in the storage unit 212 of the processor-based system 104. To reduce the amount of overhead produced by the Open Firmware, the USB host controller 112 of FIG. 1 may provide the recursion depth 504. In the illustrated embodiment, the recursion depth 504 provides a limit as to the number of levels in the device tree 500 that the Open Firmware can create. As the device tree 500 is created, the Open Firmware may terminate the creation of the device tree 500 when it reaches a level equal to the recursion depth 504. In one embodiment, the operating system 216 of FIG. 2 may apply the device driver 220 to locate the remaining devices 108 that are not mapped on the device tree 500.

Figure 5B:
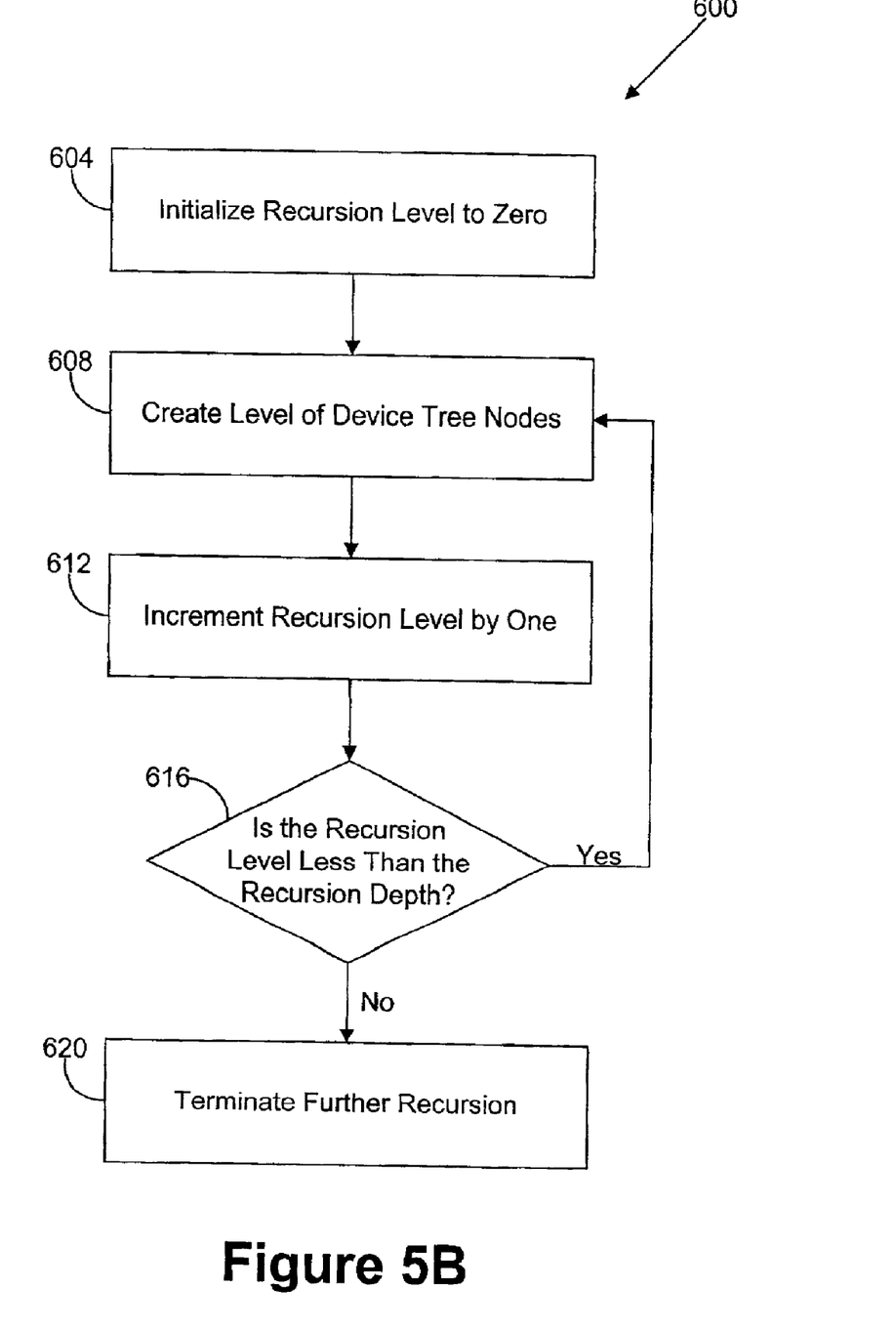
FIG. 5B illustrates a flow diagram of a method of controlling recursion during the formation of the device trees of FIGS. 4 and 5A, in accordance with one embodiment of the present invention.

Turning now to FIG. 5B, a flow diagram illustrating a method of controlling recursion during the formation of the device trees (hereinafter referred to as a "recursion control process" 600) is shown. In the illustrated embodiment, when the USB node 412 is generated, the recursion level is initialized (at 604) to zero. The recursion level, in one embodiment, provides a counter such that the Open Firmware can keep track of whether it has reached the recursion depth 504. As each level of nodes is created (at 608), the recursion level 508, 512, 516 is incremented (at 612) by one and compared to the recursion depth 504 (at 616). In one embodiment, each level of nodes may inherit the recursion level 508, 512, 516 from its parent, decrement the recursion level 508, 512, 516, and publish the decremented recursion level 508, 512, 516 for its children. If the recursion level 508, 512, 516 is less than the recursion depth 504, additional levels of nodes are created (at 608, 612, 616) until the recursion level 508, 512, 516 is not less than the recursion depth 504. If the recursion is not less than the recursion depth 504, then further recursion terminates (at 620), and therefore, the process creating the device tree 500 terminates.

Referring again to FIG. 5A and applying the recursion control process 600 of FIG. 5B, the device tree 500 with two levels of USB hubs 416 and USB devices 108 is created. When the USB node 412 is generated, the recursion level 508 is initialized (at 604) to zero and a first level of device tree nodes is created (at 608). The recursion level 512 is incremented (at 612) by one to a value of one (i.e., 0+1=1). Because the recursion level 512 is determined (at 616) to be less than the recursion depth 504 of two (i.e., one is less than two), an additional level of device tees nodes is created (at 608). The recursion level 516 is incremented (at 612) by one to a value of two (i.e., 1+1=2). Because the recursion level 516 is determined (at 616) to be not less than the recursion depth 504 of two (i.e., two is not less than two), the process to create the device tree 500 terminates (at 620). The resulting device tree 500 after the process terminates (at 620) is the device tree 500 that is formed during the boot sequence 300 of FIG. 3. As mentioned, in one embodiment, the operating system 216 operates in a conventional manner to locate the remaining devices 108 in the device tree 400 of FIG. 4 that fall below the recursion depth 504.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for device discovery of a plurality of devices coupled to a computer system, the method comprising:
    beginning the device discovery by building a device tree, wherein the building the device tree comprises creating one or more levels of device tree nodes branching from a root node using recursion, wherein the recursion is terminated in response to reaching a predetermined recursion depth, wherein the recursion depth equals a number of levels of device tree nodes; and
    completing the device discovery by discovering remaining devices of the plurality of devices in a non-recursive manner.

2. The method of claim 1, wherein the recursion depth is a property published by the root node and the one or more levels of device tree nodes.

3. A method of controlling recursion in building a device tree, the method comprising:
    incrementing a recursion level;
    if the recursion level is less than a recursion depth, creating a level of device tree nodes branching from a root node or another level of device tree nodes in the device tree; and
    if the recursion level is not less than the recursion depth, terminating the recursion in the building the device tree.

4. The method of claim 3, further comprising initializing the recursion level at the root node to zero.

5. The method of claim 3, wherein the recursion level is a property published by the root node and the level of device tree nodes.

6. The method of claim 3, wherein the level of device tree nodes inherits the recursion level from its parent node.

7. The method of claim 3, wherein incrementing the recursion level comprises incrementing the recursion level by one.

8. A method of controlling recursion at system startup, the method comprising: initializing a recursion level; creating a level of device tree nodes; incrementing the recursion level; and comparing the recursion level to a recursion depth and discontinuing the process of incrementing the recursion level and creating the level of device tree nodes in response to the recursion level being equal to the recursion depth.

9. The method of claim 8, wherein initializing the recursion level comprises initializing the recursion level at the root node to zero.

10. The method of claim 8 wherein incrementing the recursion level comprises incrementing the recursion level by one.

11. The method of claim 8, wherein the recursion level is a property published by the root node and the level of device tree nodes.

12. The method of claim 8, wherein the recursion level is a property inherited by the level of device tree nodes from its parent.

13. An article comprising one or more machine-readable storage media containing instructions that when executed enable a processor to:
    begin device discovery of a plurality of devices by building a device tree, wherein the building the device tree comprises creating one or more levels of device tree nodes branching from a root node using recursion, wherein the recursion is terminated in response to reaching a predetermined recursion depth, wherein the recursion depth equals a number of levels of device tree nodes; and
    complete the device discovery by discovering remaining devices of the plurality of devices in a non-recursive manner.

14. The article of claim 13, wherein the recursion depth is a property published by the root node and the one or more levels of device tree nodes.

15. An article comprising one or more machine-readable storage media containing instructions that when executed enable a processor to:
    increment a recursion level;
    if the recursion level is less than a recursion depth, create a level of device tree nodes branching from a root node or another level of device tree nodes in a device tree; and
    if the recursion level is not less than the recursion depth, terminate recursion in building the device tree.

16. The article of claim 15, wherein the instructions when executed enable the processor to initialize the recursion level at the root node to zero.

17. The article of claim 15, wherein the recursion level is a property published by the root node and the level of device tree nodes.

18. The article of claim 15, wherein the level of device tree nodes inherits the recursion level from its parent node.

19. The article of claim 15, wherein the instructions when executed enable the processor to increment the recursion level by one.

20. An article comprising one or more machine-readable storage media containing instructions that when executed enable a processor to initialize a recursion level, create a level of device tree nodes, increment the recursion level, and compare the recursion level to a recursion depth and discontinue the process of incrementing the recursion level and creating the level of device tree nodes in response to the recursion level being equal to the recursion depth.

21. The article of claim 20, wherein the instructions when executed enable the processor to initialize the recursion level to zero.

22. The article of claim 20, wherein the instructions when executed enable the processor to increment the recursion level by one.

23. The article of claim 20, wherein the recursion level is a property published by the root node and the level of device tree nodes.

24. The article of claim 20, wherein the recursion level is a property inherited by the level of device tree nodes from its parent.

25. An apparatus, comprising:
    a storage unit adapted to store a recursion control process; and
    a control unit adapted to execute the recursion control process, wherein the recursion control process causes the control unit to control recursion in device discovery by terminating recursion in response to reaching a predetermined recursion depth in a device tree.

26. The apparatus of claim 25, wherein the recursion control process is encoded within an FCode module.

27. The apparatus of claim 26, wherein the FCode module comprises instructions to be executed during system startup.

28. The apparatus of claim 26, wherein the FCode module is located on an internal memory of a USB device.

29. The apparatus of claim 25, further comprising a USB interface adapted to interface with one or more Universal Serial Bus (USB) devices.

30. The apparatus of claim 25, further comprising an operating system adapted to configure one or more devices.

31. The apparatus of claim 30, wherein the operating system comprises a device driver.

* * * * *